United States Patent [19]

Bjorkholm

[11] Patent Number: 4,482,957
[45] Date of Patent: Nov. 13, 1984

[54] USE OF A SQUARE ROOT AMPLIFIER FOR STATISTICS LIMITED DATA

[75] Inventor: Paul J. Bjorkholm, Sharon, Mass.
[73] Assignee: American Science and Engineering, Inc., Cambridge, Mass.
[21] Appl. No.: 318,235
[22] Filed: Nov. 4, 1981
[51] Int. Cl.³ .................... G06F 7/552; G06F 15/42
[52] U.S. Cl. ................................ 364/414; 364/554; 364/413; 364/814; 358/111; 328/144
[58] Field of Search ............... 364/413, 414, 415, 550, 364/551, 552, 554, 555, 814; 378/98, 99; 328/144, 145; 358/111, 112; 250/363 S

[56] References Cited

U.S. PATENT DOCUMENTS 3,967,105  6/1976  Harrington .................. 364/814 X
4,211,926  7/1980  Nakaya et al. .................. 378/98 X
4,279,157  7/1981  Schomberg et al. ........... 364/415 X

OTHER PUBLICATIONS

"Log-Antilog Squaring/Square Root Circuits with Applications", B. N. Chatteriji, FIG. 3.

Primary Examiner—Gary Chin
Assistant Examiner—Kevin J. Teska
Attorney, Agent, or Firm—Pollock, Vande Sande & Priddy

[57] ABSTRACT

An analog signal having a quantum noise component undergoes conversion by a square root amplifier. The converted signal then undergoes analog-to-digital conversion resulting in a digital output wherein a single bit change always represents a constant fraction of a standard deviation, independent of signal intensity. Thus, a single unit of the quantum noise component may be stored as a single bit of a data word.

4 Claims, 6 Drawing Figures

USE OF A SQUARE ROOT AMPLIFIER FOR STATISTICS LIMITED DATA

FIELD OF THE INVENTION

The present invention relates to analog-to-digital amplification and conversion and more particularly to such a system utilized in bit limited quantum noise systems.

BRIEF DESCRIPTION OF THE PRIOR ART

Many physical processes involve quantum fluctuations such as in a photon noise limited diagnostic X-ray system. Typically, in such a system, a log amplifier is connected between an X-ray detector and an analog-to-digital converter so that the detected signal is amplified and digitized. Although use of a log amplifier permits digital manipulation of the image for satisfactory results, it has been determined that the data storage requirements for data undergoing conversion, through a log amplifier, are needlessly large.

BRIEF DESCRIPTION OF THE PRESENT INVENTION

Many physical detection processes, such as the previously mentioned diagnostic X-ray system, involve quantum fluctuations such that for any measured number the standard deviation of that number is its square root. The concept of the invention is to create a conversion between the observed signal and the digitized signal presented to a storage device such that a single bit change always represents a constant fraction of a standard deviation independent of the signal intensity. This conversion is possible by utilizing a square root amplifier in lieu of the previously used log amplifier.

As a result of the present invention, it is possible to obtain improved accuracy in bit limited quantum noise systems. Further, it is possible to obtain improved information density in a storage system (efficiency of bit use).

Accordingly, the invention offers vastly improved efficiency for temporary and archival storage for systems of the type mentioned. Although the invention is discussed in terms of its application to a diagnostic X-ray system, it is to be emphasized that its application is generally directed to bit limited systems with a significant quantum noise component.

The above-mentioned objects and advantages of the present invention will be more clearly understood when considered in conjunction with the accompanying drawings, in which:

DETAILED DESCRIPTION OF THE INVENTION

Figure 1:
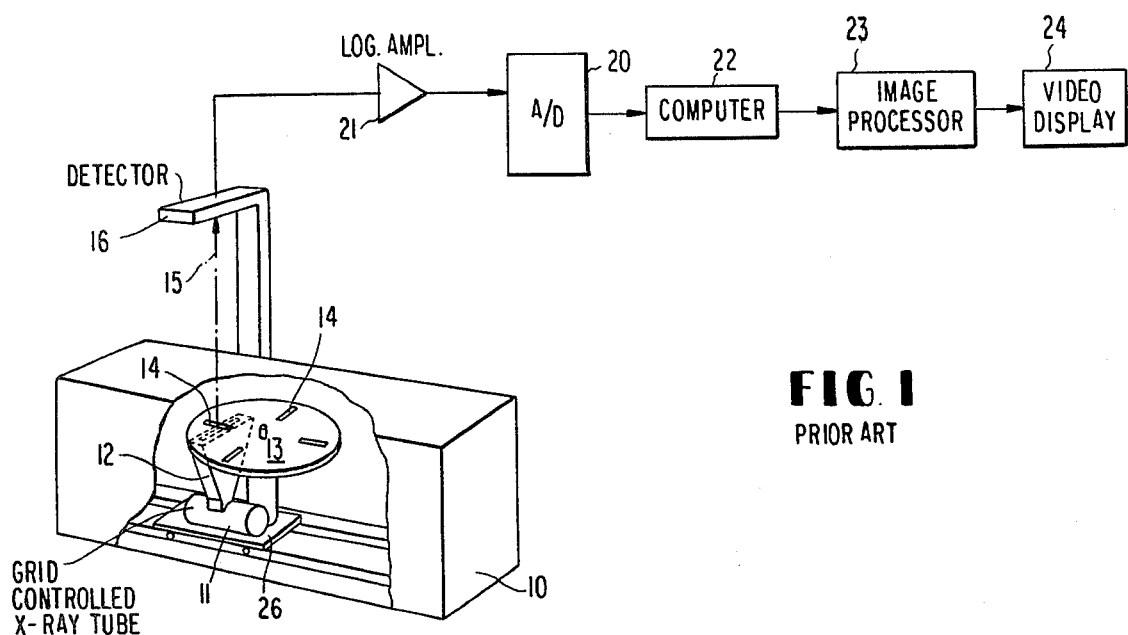
FIG. 1 is a block diagram of a prior art diagnostic X-ray system.

Prior to an explanation of the inventive square root amplifier circuit, it is instructive to consider a prior art diagnostic X-ray system so that an appreciation may be gained for an application for the invention. The prior art system shown in FIG. 1 is a simplification of the type described in U.S. Pat. No. 4,842,914, assigned to the present assignee, and entitled "Flying Spot Scanner Having Arbitrarily Shaped Field Size." FIG. 1 illustrates a table 10 on which a patient to be examined may rest. The table 10 houses an X-ray pencil beam generating system comprising an X-ray tube 11 which is adapted to emit radiation, a collimator 12 which is adapted to shape the emitted radiation into a fan beam that emerges through a comparatively narrow slit at the top of collimator 12, and a chopper disc 13 which has a plurality of radial slits or jaws 14 therein. Chopper disc 13 is so positioned relative to collimator 12 that one and only one of the slits 14 always intersects the plane of the fan beam emerging from collimator 12 whereby, as chopper disc 13 rotates, a pencil beam of X-rays 15 having a substantially rectangular cross section emerges from disc 13, passes upwardly through the region in which a body is to be examined on table 10, and scans along a line which is colinear with an elongated detector 16 that is positioned above table 10. The X-rays transmitted through the subject being examined are detected by a solid state scintillator crystal in detector 16, and viewed by an associated photo tube, the crystal being large enough to intercept the whole plane of X-rays formed by collimator 12 independent of the rotational position of the chopper disc 13. At any position of the chopper disc 13, the instrument can measure the transmission of the subject at one point and, to measure an adjacent point, all that is required is that the disc rotate slightly. In practice, the disc rotates at about 1800 rpm.

An analog signal is supplied to the analog-to-digital converter 20 from the output of detector 16 via a logarithmic amplifier 21. The output at the A/D converter 20 provides digital detector signals which are sent to a computer 22 for storage and manipulation, and an image is then created by an image processor 23 and video display 24.

Figure 6:
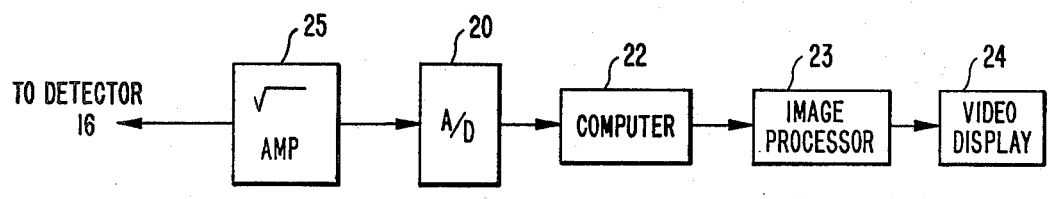
FIG. 6 is a block diagram of a diagnostic system incorporating the square root amplifier of the present invention.

Many physical phenomena including X-ray detection involves quantum fluctuations such that, for any measured number N, the standard deviation of that number is $N^{\frac{1}{2}}$. The basic recognition of the present invention is a conversion between an analog detected signal involving quantum fluctuations and its corresponding digitized signal which may be stored in such a manner that a single bit change always represents a constant fraction of a standard deviation independent of signal intensity. It is thus possible to minimize the number of bits in a data word, necessary for storage of a noise component of a signal, to a single bit indicative of a single unit of noise at an instant of time. Although this recognition and implementation, to be discussed hereinafter, is broadly applicable to quantum noise systems, it will be specifically discussed, by way of example, in the context of a diagnostic X-ray system such as that of FIGS. 1 and 6.

To minimize the number of bits required for any given image, the difference between any two quantized levels should be a constant number of standard deviations of the detected signal, independent of level. This is not true of linear or logarithmic detector preamp combinations. In particular if $$S_{log} = a \log N + b$$

where $S_{log}$ is the output signal from a log amplifier, a and b are constants, and where N is the number of photons observed, then $$\delta S_{log} = a \frac{\delta N}{N} = a \frac{N^{\frac{1}{2}}}{N} = \frac{a}{N^{\frac{1}{2}}}.$$

where $S_{log}$ is the change in the amplifier output signal due to a change in the input signal of one standard deviation, i.e., N is replaced $N + \sqrt{N}$. If the detector has a linear response $$S_{lin} = aN + b$$

where $S_{lin}$ is the output signal of a linear amplifier and a and b are constants, then $$\delta S_{lin} = a \, \delta N = aN^{\frac{1}{2}},$$

but if the detection system is set up to respond in proportion to the square root of the detected number of photons $$S_{\frac{1}{2}} = aN^{\frac{1}{2}} + b$$

where $S_{\frac{1}{2}}$ is the output signal of a square root amplifier and a and b are constants, then $$\delta S_{\frac{1}{2}} = \frac{a \, \delta N}{2 N^{\frac{1}{2}}} = \frac{a}{2}.$$

In other words, only a square root amplifier working on a quantum noise limited signal has the property that the signal noise associated with the quantum noise is independent of amplitude.

Figure 2:
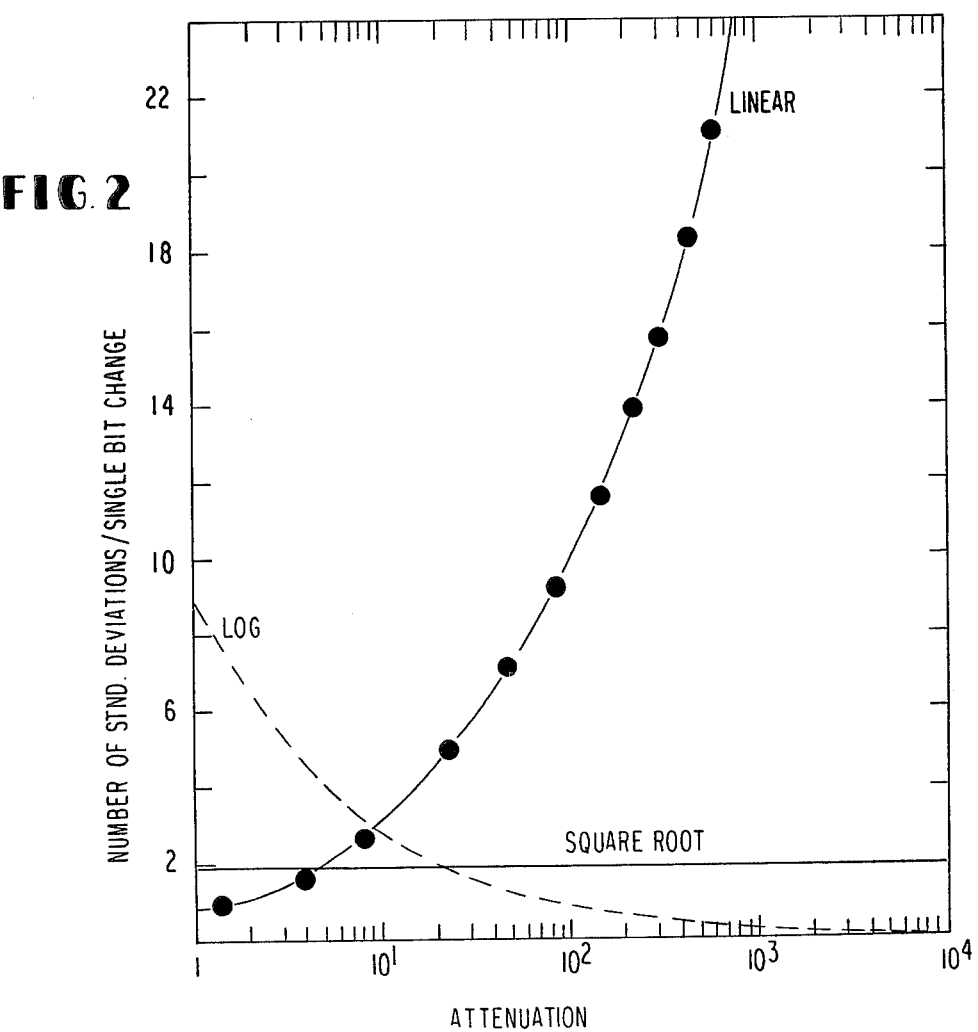
FIG. 2 is a plot of the number of standard deviations per single bit change as a function of attenuation.

In order to demonstrate this, reference is made to FIG. 2 wherein the illustrated plot shows the number of standard deviations associated with one bit as a function of attenuation. The ordinate axis of the plot corresponds to the noise component of a signal per single bit. In the instance of a diagnostic X-ray system, typical design specifications may include a 10 bit system with a maximum of $10^6$ photons per pixel in a dynamic range of $10^4$. A comparison of conversion approaches is illustrated in FIG. 2. As is evident, only the square root conversion renders a constant ordinate value as a function of attenuation. This means that a change of a single bit has the same statistical meaning, independent of attentuation. In the instance of a diagnostic X-ray system of the type discussed, a linear conversion stresses the lower attenuation portion of the image. At an attenuation of 100, one must change the input signal by 10 standard deviations to change the output by one bit. At no attenuation (air) the ratio is approximately one standard deviation to one bit. The reverse would be true for a logarithmic conversion. This would stress the highly attenuated portion of an image and compress the information in the less attenuated portions of the image.

Figure 3:
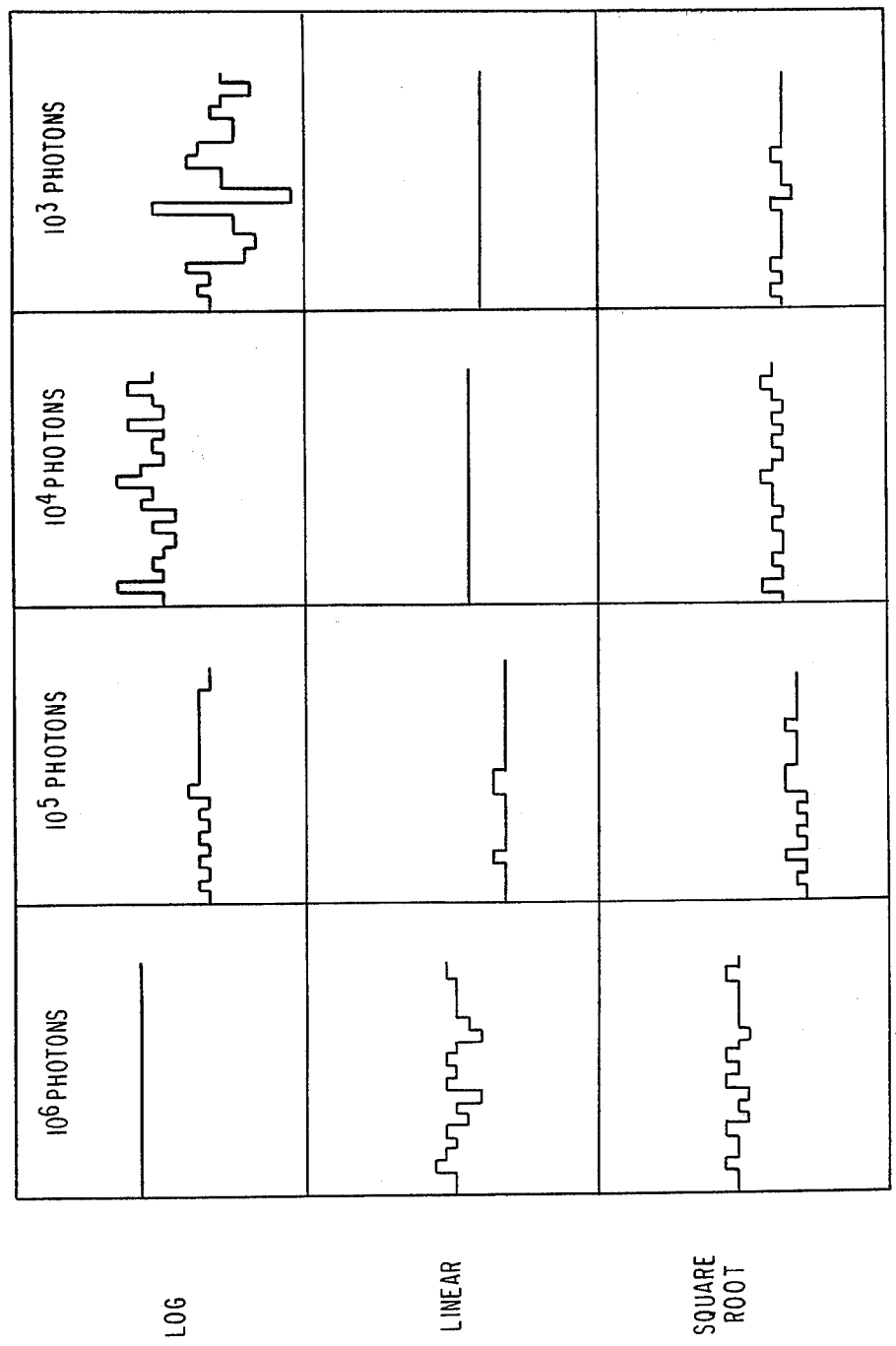
FIG. 3 is a diagrammatic table illustrating the digitization of samples utilizing three types of signal amplifiers.

FIG. 3 illustrates the same conversion properties in a different way. Each column depicts how the three types of conversions would digitize 20 samples with the same average value and normal quantum statistics. The square root amplifier places equal stress on the statistical noise over the whole dynamic range.

Figure 4:
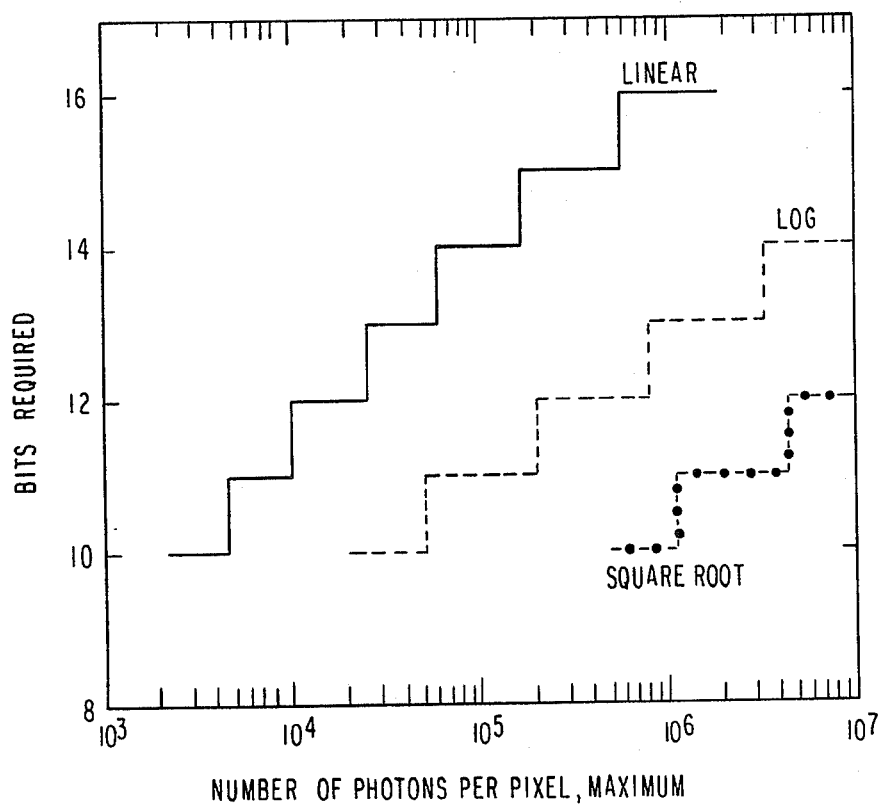
FIG. 4 is a plot of the data bits required as a function of the number of photons per pixel for the three types of signal amplifiers.

The practical importance of a square root conversion of a detected quantum fluctuation signal, for a maximum utilization of image storage space, is demonstrated in FIG. 4. This figure illustrates the number of bits per pixel required to store an image with $N_0$ photons/pixel maximum with a dynamic range of $10^4$ and at most two standard deviations per bit. Note that everywhere the linear conversion requires the most number of bits while the square root conversion requires the fewest. Assuming an image of $512 \times 512$ pixels and $10^6$ photons/pixel maximum, a linear conversion will require 98,304 more 16 bit words (assuming packing) than a square root conversion, and a log conversion requires 49,152 more 16 bit words. As will be appreciated, the increased efficiency on temporary and archival storage of data is quite substantial.

With respect to the implementation of the square root amplifier, attention is directed to the mathematical equation $$\ln^{-1}(\tfrac{1}{2} \ln(X)) = X^{\frac{1}{2}}$$

Figure 5:
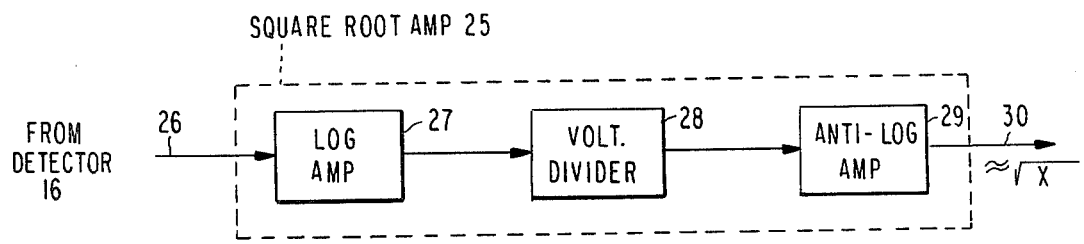
FIG. 5 is a basic block diagram of the square root amplifier of the present invention as may be used with an X-ray system of the type illustrated in FIG. 1.

This expression states that the antilog of one half ln X is equal to the square root of X. Thus, a square root amplifier may be constructed from logarithmic and antilogarithmic amplifiers. A block diagram of such a square root amplifier is shown in FIG. 5. The square root amplifier so illustrated would be the amplifier 25 shown in FIG. 6 as a substitution for the log amp 21 in FIG. 1.

The square root amplifier 25 may have its input connected to a signal source characterized by quantum fluctuations, such as detector 16 of the diagnostic X-ray system of FIG. 1. The input 26 drives a log amplifier 27 for generating the ln (X) term of the above expression. The output from log amp 27 drives a voltage divider 28 for deriving the $\tfrac{1}{2}$ ln (X) term in the above expression. The output from divider 28 in turn drives the anti-log amplifier 29 from which the square root of X may be derived at the output 30. The components 27, 28 and 29 are conventional components. Indeed, square root amplifiers, per se, are commercially available. However, the inventor is unaware of utilizing such a square root amplifier in connection with a source of a signal characterized by quantum fluctuations for conversion to a digital format so that data may be stored in a device such that a single bit change always represents a constant fraction of a standard deviation, independent of signal intensity.

It should be understood that the invention is not limited to the exact details of construction shown and described herein for obvious modifications will occur to persons skilled in the art.

I claim:

1. A method for minimizing the data storage requirement of a detected quantum noise limited signal comprising the steps:
   detecting the photons of an analog quantum limited signal wherein the standard deviation thereof is proportional to the square root of the number of detected photons;
   subjecting the detected signal to square root amplification;
   performing an analog-to-digital conversion on the signal after the amplification for transforming the magnitude of quantum noise fluctuations to a constant voltage value, independent of signal attenuation; and storing the converted signal;

wherein a single bit change of stored data represents a constant fraction of a standard deviation independent of signal intensity.

2. A method for minimizing the data storage requirement of an X-ray signal comprising the steps:

generating an X-ray beam;

detecting photons of said beam after passage through an object resulting in an X-ray signal characterized as an analog quantum limited signal wherein the standard deviation thereof is proportional to the square root of the number of detected photons;

subjecting the signal to square root amplification;

performing an analog-to-digital conversion on the signal after the amplification for transforming the magnitude of quantum noise fluctuations to a constant voltage value, independent of signal attenuation; and storing the converted signal as a binary data word wherein a single bit change always represents a constant fraction of a standard deviation independent of signal intensity.

3. A circuit for converting quantum limited signals to minimized digital data, the circuit comprising:

means for detecting the photons of an analog quantum limited signal wherein the standard deviation thereof is proportional to the square root of the number of detected photons;

square root amplifying means connected at the input thereof to the output of the detecting means; and analog-to-digital converting means connected at the input thereof to the output of the amplifying means for transforming the magnitude of quantum noise fluctuations to a constant voltage value independent of signal attenuation; and means for storing the converted signal;

wherein a single bit change of stored data represents a constant fraction of a standard deviation, independent of signal intensity.

4. The structure of claim 3 wherein the square root amplifying means comprises:

a logarithmic amplifier;

means for dividing an output from the logarithmic amplifier by a preselected constant; and an anti-logarithmic amplifier having its input connected to an output of the dividing means.

* * * * *